US009599151B2

(12) United States Patent
Habibvand et al.

(10) Patent No.: US 9,599,151 B2
(45) Date of Patent: Mar. 21, 2017

(54) DOUBLE ROW PRELOADED BALL BEARING WITH SPACER BALLS

(71) Applicant: ROLLER BEARING COMPANY OF AMERICA, INC., Oxford, CT (US)

(72) Inventors: Alex Habibvand, Orange, CA (US); Deepak Singhal, Buena Park, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 14/888,968

(22) PCT Filed: May 10, 2013

(86) PCT No.: PCT/US2013/040488
§ 371 (c)(1),
(2) Date: Nov. 4, 2015

(87) PCT Pub. No.: WO2014/182307
PCT Pub. Date: Nov. 13, 2014

(65) Prior Publication Data
US 2016/0076585 A1    Mar. 17, 2016

(51) Int. Cl.
*F16C 19/20* (2006.01)
*F16C 19/18* (2006.01)
*F16C 33/37* (2006.01)

(52) U.S. Cl.
CPC ............ *F16C 19/20* (2013.01); *F16C 19/184* (2013.01); *F16C 33/3713* (2013.01)

(58) Field of Classification Search
CPC ..... F16C 19/20; F16C 19/184; F16C 33/3713
See application file for complete search history.

(56) References Cited

U.S. PATENT DOCUMENTS

| 468,067 | A | 2/1892 | Yates |
|---|---|---|---|
| 1,072,080 | A | 9/1913 | Bright |
| 1,262,208 | A | 4/1918 | Kelly |
| 1,375,112 | A | 4/1921 | Searles |
| 1,379,945 | A | 5/1921 | Teetsow |
| RE15,223 | E | 11/1921 | R. W. Sellew |
| 1,418,886 | A | 6/1922 | Searles |

(Continued)

FOREIGN PATENT DOCUMENTS

| CN | 101512170 A | 8/2009 |
|---|---|---|
| CN | 101535664 A | 9/2009 |

(Continued)

OTHER PUBLICATIONS

International Preliminary Report on Patentability for PCT/US2013/040488, dated May 29, 2015, pp. 1-20.

(Continued)

*Primary Examiner* — Thomas R. Hannon
(74) *Attorney, Agent, or Firm* — MKG, LLC

(57) ABSTRACT

A ball bearing includes an outer ring having at two outer raceways and an inner ring having two inner raceways. A plurality of balls is disposed in each of the two inner and outer raceways. The plurality of balls include load bearing balls and spacer balls. The spacer balls are disposed between the load bearing balls. Each of the load bearing balls has a single point of contact with each of the two inner and outer raceways. The load bearing balls are preloaded between the outer ring and the inner ring at predetermined force.

11 Claims, 4 Drawing Sheets

(56) References Cited

U.S. PATENT DOCUMENTS

| | | |
|---|---|---|
| 1,418,888 A | 6/1922 | Winchester |
| 2,724,624 A | 11/1955 | Barr |
| 3,708,215 A | 1/1973 | Wilcock et al. |
| 3,958,847 A | 5/1976 | Cain et al. |
| 4,730,946 A | 3/1988 | Cain |
| 4,765,688 A | 8/1988 | Hofmann et al. |
| 4,835,829 A | 6/1989 | Welschof et al. |
| 5,021,035 A | 6/1991 | Zhou |
| 5,193,916 A | 3/1993 | Andersson |
| 5,310,268 A | 5/1994 | Schlereth |
| 5,501,530 A | 3/1996 | Nagai et al. |
| 6,661,143 B1 | 12/2003 | Ohura |
| 6,712,518 B2 | 3/2004 | Takamizawa et al. |
| 6,851,866 B2 | 2/2005 | Kayama et al. |
| 6,868,749 B2 | 3/2005 | Cashatt et al. |
| 6,971,802 B2 | 12/2005 | Vezina |
| 7,059,777 B2 | 6/2006 | Kawaguchi et al. |
| 7,594,759 B2 | 9/2009 | Kawaguchi et al. |
| 8,202,007 B2 | 6/2012 | Abraham et al. |
| 2002/0044706 A1 | 4/2002 | Kayama et al. |
| 2002/0097935 A1 | 7/2002 | Beckers et al. |
| 2004/0131294 A1 | 7/2004 | Obara |
| 2004/0213493 A1 | 10/2004 | Takamizawa et al. |
| 2004/0234182 A1 | 11/2004 | Tajima et al. |
| 2005/0031241 A1 | 2/2005 | Obara |
| 2005/0220383 A1 | 10/2005 | Yokota et al. |
| 2005/0238273 A1 | 10/2005 | Kawamura et al. |
| 2006/0232425 A1 | 10/2006 | Ueno |
| 2008/0193072 A1 | 8/2008 | Hattori et al. |
| 2008/0247699 A1 | 10/2008 | Braun |
| 2012/0142468 A1 | 6/2012 | Lescorail et al. |

FOREIGN PATENT DOCUMENTS

| | | |
|---|---|---|
| CN | 10167259 A | 3/2010 |
| CN | 102182754 A | 9/2011 |
| CN | 202901354 U | 12/2011 |
| DE | 112004002295 T5 | 9/2006 |
| EP | 0586776 B1 | 12/1995 |
| EP | 1719926 A1 | 11/2006 |
| EP | 2253483 B1 | 7/2012 |
| JP | 07167138 A | 7/1995 |
| JP | 2001041232 | 2/2001 |
| JP | 201163231 A | 6/2001 |
| JP | 2002317819 A | 10/2002 |
| JP | 2003139146 A | 5/2003 |
| JP | 2003166627 A | 6/2003 |
| JP | 2003314541 A | 11/2003 |
| JP | 2005061432 A | 3/2005 |
| JP | 2005061433 A | 3/2005 |
| JP | 2006046380 A | 2/2006 |
| JP | 2006105384 A | 4/2006 |
| JP | 2006153094 A | 6/2006 |
| JP | 2006329420 A | 12/2006 |
| JP | 2008185062 A | 8/2008 |
| JP | 2008240957 A | 10/2008 |
| JP | 2010001972 A | 1/2010 |
| JP | 2010090942 A | 4/2010 |
| JP | 2010001924 A | 10/2010 |
| JP | 4743176 B2 | 8/2011 |
| JP | 2011163541 A | 8/2011 |
| JP | 2011202739 A | 10/2011 |
| JP | 4922179 B2 | 4/2012 |
| WO | 2009078337 A1 | 6/2009 |

OTHER PUBLICATIONS

International Search Report for PCT Application No. PCT/US2013/04088, mailed Jan. 29, 2014, pp. 1-9.

DOUBLE ROW PRELOADED BALL BEARING WITH SPACER BALLS

FIELD OF THE INVENTION

The present invention is generally directed to a double row ball bearing and is more specifically directed to a preloaded double row ball bearing having spacer balls.

BACKGROUND OF THE INVENTION

Many types of bearings can be used to support radial, thrust, or combination radial and thrust loads. Such bearings include ball, roller, plain, journal and tapered roller bearings. Typically, rolling bearings include an outer ring having a generally cylindrical exterior surface and a generally cylindrical inner surface defining an interior area of the outer ring. An inner ring having a generally cylindrical outside surface is disposed in the interior area of the outer ring. A plurality of rolling elements, such as balls or needle rollers are disposed in a cavity between the outside surface of the inner ring and the inner surface of the outer ring.

The outer ring and/or the inner ring can rotate relative to one another. For example, the inner ring may be secured to a shaft and the outer ring can rotate relative to the inner ring and the shaft. During rotation of the outer ring and/or the inner ring relative to one another, the bearing may be subject to cyclic loads that could cause fatigue failure of the bearing. Fatigue life of bearings can be represented as a "L10" life. This is the life at which ten percent of the bearings in that application can be expected to have failed due to classical fatigue failure or, alternatively, the life at which ninety percent will still be operating. The L10 life of the bearing is the theoretical life.

Some bearings are subject to high load rates and/or high rotational accelerations rotations that could cause the rolling elements to slip, skid and/or cause backlash of the rolling elements in the outer ring and/or the inner ring. Such slippage, skidding and backlash could degrade bearing performance and result in premature failure of the bearing.

SUMMARY OF THE INVENTION

According to an aspect of the present invention, there is provided a ball bearing, including an outer ring having at a first outer raceway and a second outer raceway each being defined by a portion of a radially inward facing surface of the outer ring; and an inner ring disposed within the outer ring and having a first inner raceway and a second inner raceway each being defined by a radially outward facing surface of the inner ring. The ball bearing includes a first plurality of balls disposed partially in the first inner raceway and first outer raceway; and a second plurality of balls disposed partially in the second inner raceway and second outer raceway. The first plurality of balls and the second plurality of balls each include load bearing balls and spacer balls. The spacer balls are disposed between the load bearing balls. Each of the load bearing balls of the first plurality of balls has a first single point of contact with the first outer raceway and second single point of contact with the first inner raceway. The first single point of contact and the second single point of contact define a first line of contact. Each of the load bearing balls of the second plurality of balls has a third single point of contact with the second outer raceway and fourth single point of contact with the second inner raceway. The third single point of contact and the fourth single point of contact defining a second line of contact. The first line of contact and the second line of contact have a point of intersection a point radially away from the outer ring, thereby defining a back-to-back configuration of the first outer raceway and the second outer raceway in the outer ring. The load bearing balls are preloaded between the outer ring and the inner ring at predetermined force.

DETAILED DESCRIPTION

Figure 1:
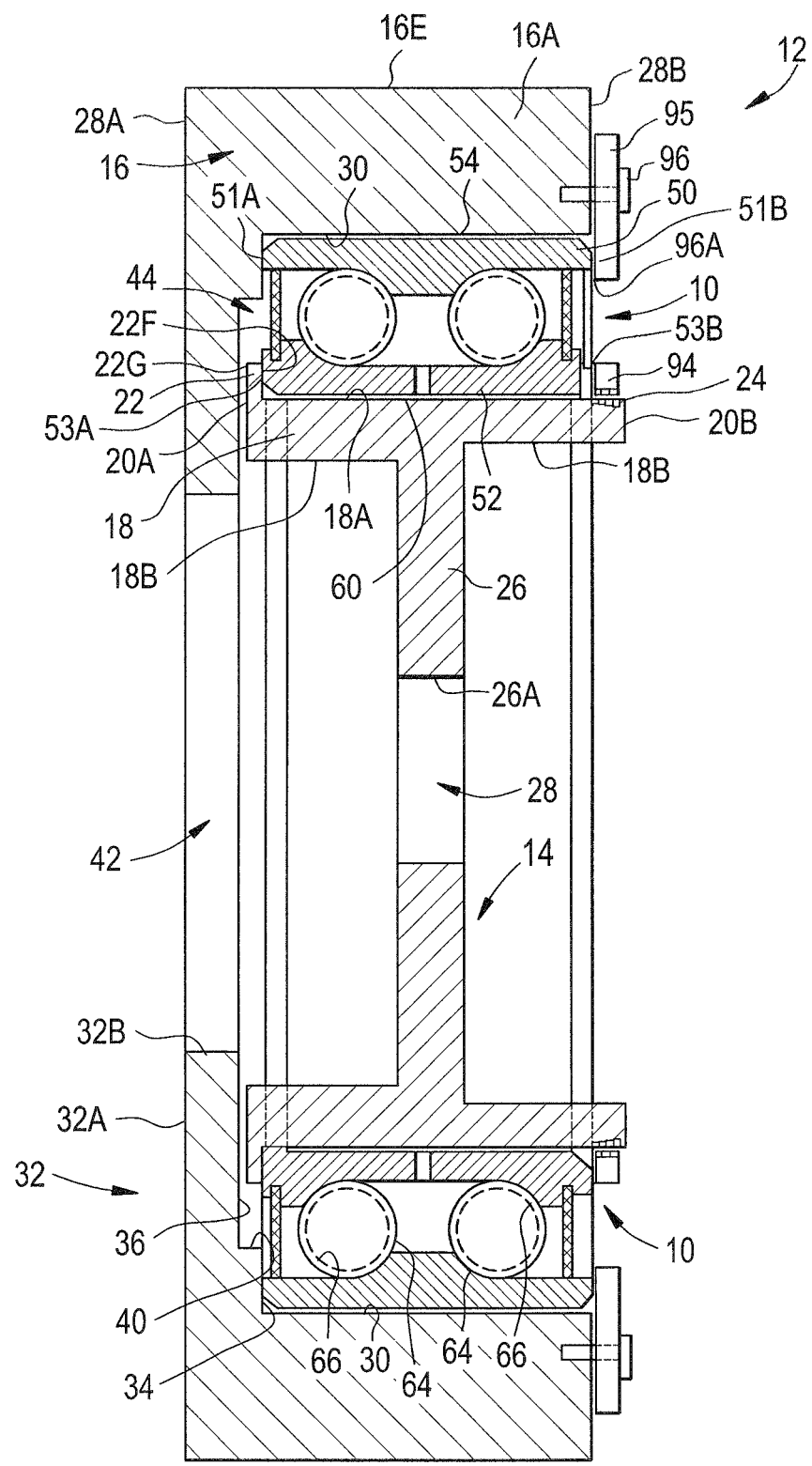
FIG. 1 is a cross sectional view of the roller bearing in accordance with an embodiment of the present invention, installed in a housing.
Figure 3:
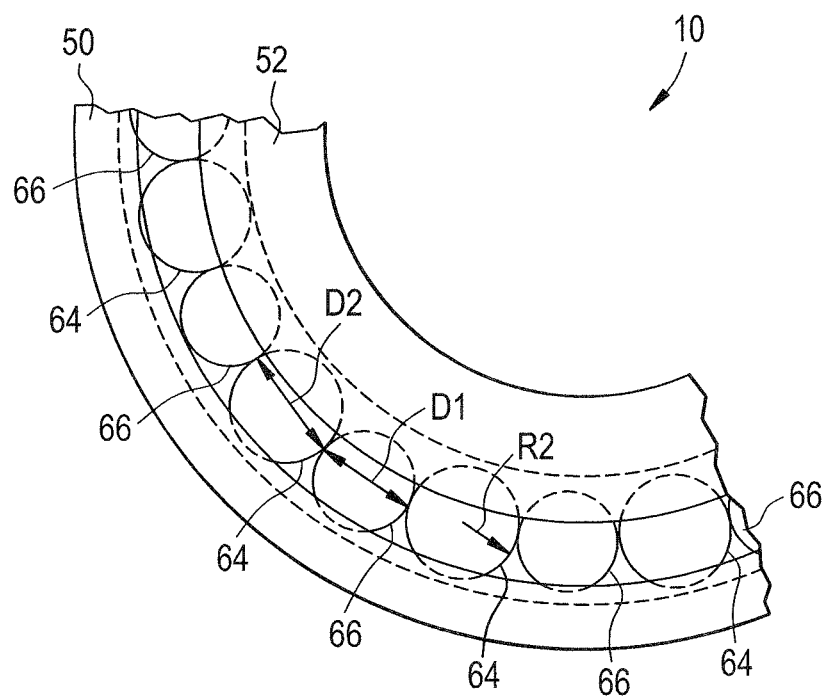
FIG. 3 is an enlarged side view of a portion of the roller bearing of FIG. 1.

As shown in FIG. 1 a ball bearing cartridge, generally designated by the reference numeral 10, is installed in a housing assembly 12. The housing assembly 12 includes an inner member 14 and an outer member 16 positioned around the inner member, with the ball bearing cartridge 10 positioned therebetween. The ball bearing cartridge 10 is a preloaded double row bearing, as described in detail below. The ball bearing cartridge 10 includes an outer ring 50 surrounding an inner ring 52 and having a plurality of load bearing balls 64 and spacer balls 66 disposed therebetween, as shown in FIG. 3 and described further below. While the ball cartridge bearing 10 is shown and described as being a double row bearing, the present invention is not limited in this regard as three or more rows may be employed without departing from the broader aspects disclosed herein.

The inner member 14 has an annular outer flange 18 having a substantially cylindrical exterior surface 18A and a substantially cylindrical interior surface 18B, each extending between a first end 20A and a second end 20B of the flange. The exterior surface 18A has a lip 22 extending radially outward from a portion of the exterior surface 18A proximate the first end 20A. The lip 22 defines an axially facing abutment surface 22F and an axially facing outer surface 22G on opposing faces of the lip. A portion of the exterior surface 18A proximate the second end 20B has male threads 24 formed therein. The inner member 14 has a central web 26 which extends radially inward from the interior surface 18A of the flange 18. The web 26 terminates at a substantially annular interior surface 26A which defines a bore 28 extending through the web.

The outer member 16 includes an annular body 16A having an exterior surface 16E that extends between a first end 28A and a second end 28B of the annular body. The annular body 16A has an interior surface 30. The annular body 16A includes a radially inwardly projecting stepped flange 32 having an axially outward facing surface 32A on a first face of the stepped flange. A second face of the stepped flange 32, opposite the first face includes an axially facing abutment surface 34 proximate the interior surface 30. The second face of the stepped flange 32 includes an axially facing surface 36 positioned axially between the outward facing surface 32A and the abutment surface 34. The axially facing surface 36 extends radially inward from a shoulder 40 to a radially interior surface 32B of the stepped flange 32. The radially interior surface 32B defines a bore 42 that extends through the stepped flange 32.

The interior surface 30, the axially facing abutment surface 34, the axially facing abutment surface 22F and the cylindrical exterior surface 18A cooperate with one another to define a pocket 44 in which the ball bearing cartridge 10 is disposed, as described below.

Figure 2:
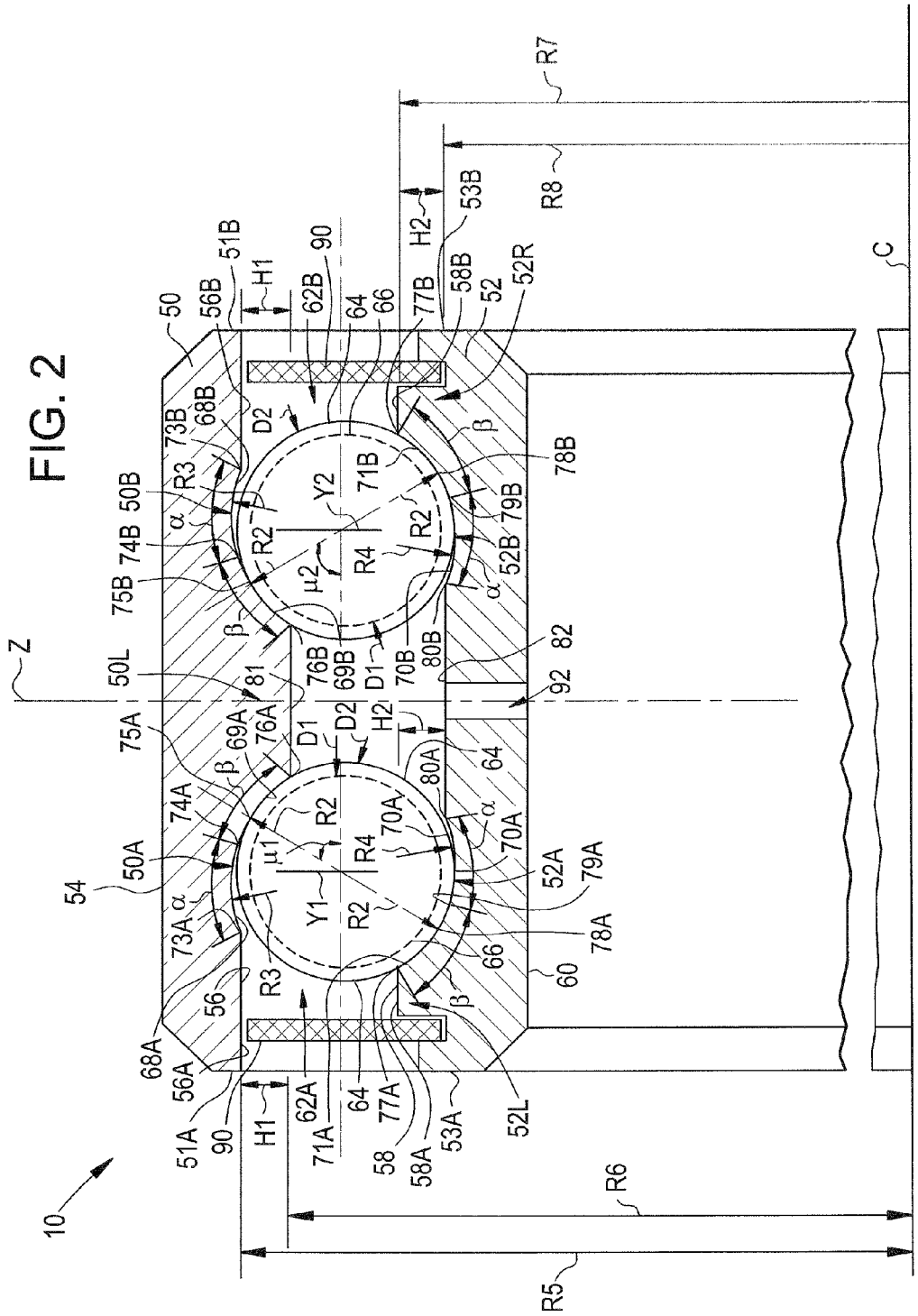
FIG. 2 is an enlarged view of a portion of the roller bearing of FIG. 1.
Figure 4:
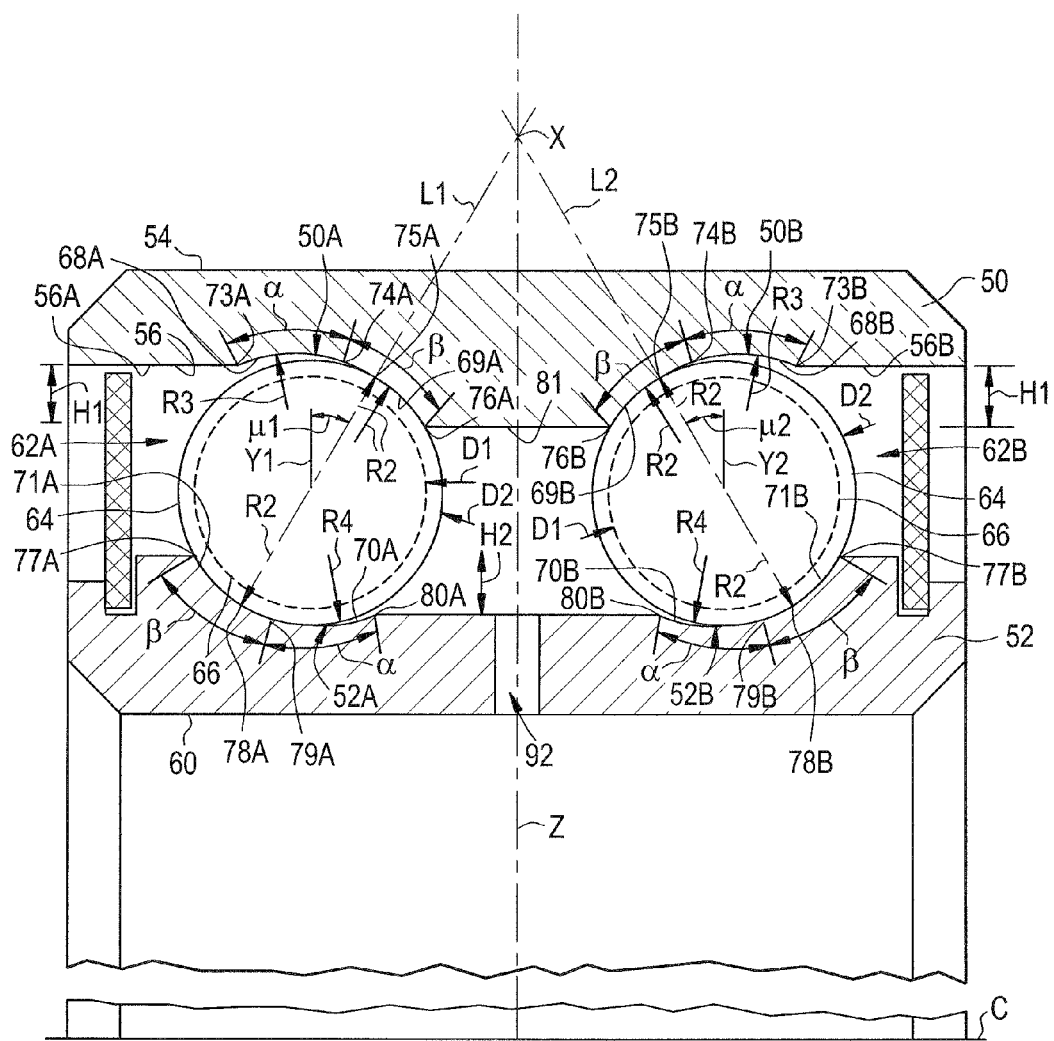
FIG. 4 is an enlarged view of the portion of the roller bearing of FIG. 2.

Referring to FIGS. 2 and 4, the ball bearing cartridge 10 includes an outer ring 50 and an inner ring 52 disposed substantially concentrically within the outer ring. The outer ring 50 has a substantially cylindrical exterior surface 54 extending between a first axial end 51A and a second axial end 51B of the outer ring. The inner ring 52 has an inside surface 60 extending between a first end 53A and a second end 53B of the inner ring. The outer raceway 50A and the inner raceway 52A define a first annular cavity 62A therebetween. Similarly, the outer raceway 50B and the inner raceway 52B define a second annular cavity 62B therebetween. In one embodiment, the inner ring 50 and/or the outer ring 52 are manufactured from AMS-5630 type 440C stainless steel having a minimum Rockwell C scale hardness of 58. While the inner ring 50 and/or the outer ring 52 are described as being manufactured from AMS-5630 type 440C stainless steel having a minimum Rockwell C scale hardness of 58, the present invention is not limited in this regard as other materials having other hardness values may be employed for manufacture of the inner ring 50 and/or the outer ring 52.

Referring back to FIG. 1, the ball bearing cartridge 10 is disposed in the pocket 44 with the first end 51A of the outer ring 50 engaging the axially facing abutment surface 34 and the first end 53A of the inner ring 52 engaging the axially facing abutment surface 22F. A nut 94 is threaded on the male threads 24 and an axial face of the nut engages the second end 53B of the inner ring 52 and secures the inner ring in the pocket. A retaining ring 96 is secured to the second end 28B of the annular body 16A by suitable fasteners 96 (e.g., bolts). An axially inward facing portion 96A of the retaining ring engages the second end 51B of the outer ring 50 to secure the outer ring 50 in the pocket 44.

As illustrated in FIGS. 2 and 4, the outer ring 50 has two outer raceways 50A and 50B, each defined by portions of a radially inward facing surface 56 of the outer ring, as described below. The radially inward facing surface 56 includes a first substantially cylindrical surface 56A proximate the first end 51A and having a radius R5 measured from a longitudinal axis C of the ball bearing cartridge 10. The radially inward facing surface 56 includes a second substantially cylindrical surface 56B proximate the second end 51B and having a radius R5 measured from a longitudinal axis C of the ball bearing cartridge 10. A central portion of the radially inward facing surface 56 is stepped radially inward from the surfaces 56A and 56B by a distance H1 and defines a lobe 50L. The lobe 50L defines a third substantially cylindrical and radially inward facing surface 81 having a radius R6 measured from the longitudinal axis C. The outer raceways 50A and 50B are mirror images of one another about a central plane Z and are positioned on opposite sides of the lobe 50L. The outer raceway 50A extends arcuately along a portion of the radially inward facing surface 56 between the first substantially cylindrical surface 56A and an edge of the third substantially cylindrical surface 81, as described further below. The outer raceway 50B extends arcuately along a portion of the radially inward facing surface 56 between the second substantially cylindrical surface 56B and another edge of the third substantially cylindrical surface 81, as described further below.

Still referring to FIGS. 2 and 4, the outer raceway 50A defines a first raceway surface 68A and second raceway surface 69A. The first raceway surface 68A has a radius of curvature R3 and extends across an arc defined by an angle α which extends from point 73A to point 74A. The second raceway surface 69A has a radius of curvature R2, about equal to a radius of curvature R2 of the load bearing balls 64. The second raceway surface 69A extends across an arc defined by an angle β which extends from point 74A to point 76A. The radius of curvature R3 is greater than the radius of curvature R2. Each of the load bearing balls 64 has a single point of contact 75A with the second raceway surface 69A. The single point of contact 75A is positioned between the points 74A and 76A.

Referring to FIGS. 2 and 4, the outer raceway 50B defines a first raceway surface 68B and second raceway surface 69B. The first raceway surface 68B has a radius of curvature R3 and extends across an arc defined by an angle α which extends from point 73B to point 74B. The second raceway surface 69B has a radius of curvature R2, about equal to the radius of curvature R2 of the load bearing balls 64. The second raceway surface 69B extends across an arc defined by an angle β which extends from point 74B to point 76B. The radius of curvature R3 is greater than the radius of curvature R2. Each of the load bearing balls 64 has a single point of contact 75B with the second raceway surface 69B. The single point of contact 75B is positioned between the points 74B and 76B.

Referring to FIGS. 2 and 4, the inner ring 52 has an inside surface 60 extending between a first end 53A and a second end 53B of the inner ring. The inner ring 52 has a two inner raceways 52A and 52B each defined by portions of a radially outward facing surface 58 of the outer ring, as described below. The radially outward facing surface 58 includes a first substantially cylindrical surface 58A proximate the first end 53A and having a radius R7 measured from a longitudinal axis C. The radially outward facing surface 58 includes a second substantially cylindrical surface 58B proximate the second end 53B and having a radius R7 measured from a longitudinal axis C. A central portion of the radially outward facing surface 58 is stepped radially inward from the surfaces 58A and 58B by a distance H2 and defining a radially outward facing fourth cylindrical surface 82 having a radius R8 measured from the longitudinal axis C. The inner raceways 52A and 52B are mirror images of one another about the central plane Z and are positioned on opposite sides of the fourth cylindrical surface 82. The inner raceway 52A extends arcuately along a portion of the radially outward facing surface 58 between the first substantially cylindrical surface 58A and an edge of the fourth cylindrical surface 82, as described further below. The inner raceway 52B extends arcuately along a portion of the radially outwardly facing surface 58 between the second substantially cylindrical surface 58B and another edge of the fourth cylindrical surface 82, as described further below.

Still referring to FIGS. 2 and 4, the inner raceway 52A defines a first raceway surface 70A and second raceway surface 71A. The first raceway surface 70A has a radius of curvature R4 and extends across an arc defined by an angle α which extends from point 79A to point 80A. The second raceway surface 71A has a radius of curvature R2, about equal to a radius of curvature R2 of the load bearing balls 64. The second raceway surface 71A extends across an arc defined by an angle β which extends from point 77A to point 79A. The radius of curvature R4 is greater than the radius of curvature R2. Each of the load bearing balls 64 has a single point of contact 78A with the second raceway surface 71A. The single point of contact 78A is positioned between the points 77A and 79A.

Referring to FIGS. 2 and 4, the inner raceway 52B defines a first raceway surface 70B and second raceway surface 71B. The first raceway surface 70B has a radius of curvature R4 and extends across an arc defined by an angle α which extends from point 79B to point 80B. The second raceway surface 71B has a radius of curvature R2, about equal to a radius of curvature R2 of the load bearing balls 64. The second raceway surface 71B extends across an arc defined by an angle β which extends from point 77B to point 79B. The radius of curvature R4 is greater than the radius of curvature R2. Each of the load bearing balls 64 has a single point of contact 78B with the second raceway surface 71B. The single point of contact 78B is positioned between the points 77B and 79B.

The single point of contact 75A (between the load bearing balls 64 and the outer raceway 50A) and the single point of contact 78A (between the load bearing balls 64 and the inner raceway 52A) align along a reference line L1. The single point of contact 75B (between the load bearing balls 64 and the outer raceway 50B) and the single point of contact 78B (between the load bearing balls 64 and the inner raceway 52B) align along a reference line L2. The reference line L1 defines a contact angle $\mu_1$ relative to a reference line Y1. The reference line L2 defines a contact angle $\mu_2$ relative to a reference line Y2. The reference line L1 is skewed clockwise through the angle $\mu_1$ towards the reference line L2 and the reference line L2 is skewed counterclockwise through the angle $\mu_2$ towards the reference line L1, resulting in a back-to-back configuration of the reference lines L1 and L2. Such a back-to-back configuration establishes maintains the preloads of the balls. In one embodiment the contact angle $\mu_1$ is about 30 degrees plus or minus 10%.

As illustrated in FIGS. 2 and 4, each of the load bearing balls 64 in the first annular cavity 62A has single point of contact 75A with the first outer raceway 50A and has the single point of contact 78A with the inner raceway 52A. The single point of contact 75A and the single point of contact 78A define the first line of contact L1. Each of the load bearing balls 64 has the single point of contact 75B with the outer raceway 50B and has the single point of contact 78B with the inner raceway 52B. The single point of contact 75B and the single point of contact 78B define the second line of contact L2. The first line of contact L1 and the second line of contact L2 have a point of intersection X a point radially away from the outer ring 50, thereby defining a back-to-back configuration of the first outer raceway and the second outer raceway in the outer ring.

Referring to FIGS. 1-3, and as best shown in FIG. 3, a plurality of load bearing balls 64 and spacer balls 66 are disposed in the first annular cavity 62A and the second annular cavity 62B. Adjacent pairs of the load bearing balls 64 have one of the spacer balls 66 disposed between them. In particular, one of the spacer balls 66 is disposed between and engage every adjacent pair of load bearing balls 64. In FIGS. 1 and 2 the load bearing balls 64 are shown as solid lines and the spacer balls 66 are shown behind the load bearing balls 64 as dashed lines. As shown in FIGS. 2 and 3, the spacer balls 66 have an outside diameter D1 that is about 90 to 93 percent of a diameter D2 of the load bearing balls 64. The load bearing balls 64 have a radius of curvature R2 that is about one half of D2. In one embodiment the load bearing balls 64 and the spacer balls 66 are manufactured from the same material, for example, an AMS-5630 type 440C stainless steel having a minimum Rockwell C scale hardness of 58. The use of the spacer balls 66 reduces ball drag and increases bearing life compared to bearing using cage type separators to space the load bearing balls away from one another. While the load bearing balls 64 and the spacer balls 66 are described as being manufactured from the same material, for example, an AMS-5630 type 440C stainless steel having a minimum Rockwell C scale hardness of 58, the present invention is not limited in this regard as the load bearing balls 64 and/or the spacer balls 66 may be manufactured from materials other than AMS-5630 type 440C stainless steel having a minimum Rockwell C scale hardness of 58.

The ball bearing cartridge 10 is provided with annular seals 90 disposed in opposing ends of thereof and extending between the outer ring 50 and the inner ring 52. The seals 90 prevent debris from entering the annular cavities 62A and 62B. In addition, the inner ring 52 includes a one or more passages 92 extending through a central portion of the inner ring, for use in introduction of a lubricant such as oil or grease into the annular cavities 62A and 62B. In one embodiment the annular seals are manufactured form a 300 series stainless steel.

The inner ring 52 and the outer ring 50 are adjusted axially with respect to one another and the load bearing balls and the spacer balls 66 are disposed in the first outer raceway 50A and the first inner raceway 52A; and in the second outer raceway 50B and second inner raceway 52B, such that the load bearing balls 66 are preloaded (e.g., under compression) to about 500 pounds (about 2222 Newtons) plus or minus 10%, along the reference lines L1 and L2, respectively. Preloading of the load bearing balls 64 in the respective raceways prevents backlash and prevents the load bearing balls from skidding relative to the respective raceways in response to high rotational acceleration of the inner ring 52 relative to the outer ring 50. In addition preloading the ball bearing cartridge to about 500 pounds results in a break-away torque of about 0.80 Newton-meters, of the outer ring 50 relative to the inner ring 52.

In one embodiment, the ball bearing cartridge 10 has an L10 life of over 9000 hours when being subject to rotational speeds up to 175 RPM, high rotational accelerations, torque loads up to about 4600 Newton-meters, radial loads of up to about 96,000 Newtons and axial loads of up to about 4,500 Newtons.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ball bearing, comprising:
   a metallic outer ring, having a first outer raceway and a second outer raceway each being defined by a portion of a radially inward facing surface of the outer ring, the first outer raceway and the second outer raceway each having an arcuate cross section;
   a metallic inner ring disposed within the outer ring and having a first inner raceway and a second inner raceway each being defined by a radially outward facing surface of the metallic inner ring the first inner raceway and the second inner raceway each having an arcuate cross section; and a first plurality of metallic balls disposed partially in the first inner raceway and the first outer raceway, a second plurality of metallic balls disposed partially in the second inner raceway and the second outer raceway, the first plurality of metallic balls and the second plurality of metallic balls each including metallic load bearing balls and metallic spacer balls, each of the metallic spacer balls of the first plurality of balls engages two adjacent metallic load bearing balls to prevent skidding of the metallic load bearing balls relative to the first outer raceway and the first inner raceway, when the metallic outer ring is rotationally accelerated relative to the metallic inner ring, each of the metallic spacer balls of the second plurality of metallic balls engages two adjacent metallic load bearing balls to prevent skidding of the metallic load bearing balls relative to the second outer raceway and the second inner raceway, when the metallic outer ring is rotationally accelerated relative to the inner metallic ring;

each of the metallic load bearing balls of the first plurality of metallic balls having a first single point of contact with the first outer raceway and a second single point of contact with the first inner raceway, the first single point of contact and the second single point of contact defining a first line of contact;

each of the metallic load bearing balls of the second plurality of metallic balls having a third single point of contact with the second outer raceway and a fourth single point of contact with the second inner raceway, the third single point of contact and the fourth single point of contact defining a second line of contact;

the first line of contact and the second line of contact having a point of intersection at a point radially away from the metallic outer ring, thereby defining a back-to-back configuration of the first outer raceway and the second outer raceway in the outer ring; and the metallic load bearing balls being preloaded between the metallic outer ring and the metallic inner ring at a preload force of 450 to 550 pounds, the preload force being established and maintained by the back-to-back configuration.

2. The ball bearing of claim 1, wherein the metallic load bearing balls and the metallic spacer balls are manufactured from the same material.

3. The ball bearing of claim 1, wherein the metallic load bearing balls and the metallic spacer balls are manufactured from an AMS-5630 type 440C stainless steel.

4. The ball bearing of claim 1, wherein the metallic load bearing balls and the metallic spacer balls are manufactured from an AMS-5630 type 440C stainless steel having a minimum Rockwell C scale hardness of 58.

5. The ball bearing of claim 1,
the first outer raceway and the first inner raceway having a first reference line substantially parallel with a central plane of the bearing;
the second outer raceway and the second inner raceway having a second reference line substantially parallel with the central plane;
a first contact angle defined between the first line of contact and the first reference line; and
a second contact angle defined between the second line of contact and the second reference line;
the first line of contact skewed clockwise through the first contact angle toward second line of contact, and
the second line of contact skewed counterclockwise through the second contact angle toward the first line of contact.

6. The ball bearing of claim 5, the first contact angle is in the range of about 27 degrees to 33 degrees.

7. The ball bearing of claim 6, the second contact angle is in the range of about 27 degrees to 33 degrees.

8. The ball bearing of claim 1, further comprising:
a first outer diameter defined by the metallic spacer balls; and
a second outer diameter defined by the metallic load bearing balls;
the first diameter being less than the second diameter.

9. The ball bearing of claim 1, having an L10 life of over 9000 hours when being subject to rotational speeds up to 175 RPM, torque loads up to about 4600 Newton-meters, radial loads of up to about 96,000 Newtons and axial loads of up to about 4,500 Newtons.

10. The ball bearing of claim 1, wherein the pre-load force of 450 to 550 pounds results in a break-away torque of about 0.80 Newton-meters, of the metallic outer ring relative to the metallic inner ring.

11. A ball bearing cartridge, comprising:
an outer ring, having a first end, a second end, a first outer raceway and a second outer raceway each being defined by a portion of a radially inward facing surface of the outer ring,
the radially inward facing surface having a first substantially cylindrical surface proximate the first end having a first radius measured from a longitudinal axis of the ball bearing cartridge,
the radially inward facing surface having a second substantially cylindrical surface proximate the second end having the first radius,
the radially inward facing surface having a radially inward facing third substantially cylindrical surface having a second radius measured from the longitudinal axis C where the second radius is less than the first radius, the first outer raceway defining a first raceway surface having a first radius of curvature extending across a first arc defined by a first angle which extends from a first point to a second point,
the first outer raceway defining a second raceway surface having a second radius of curvature extending across a second arc defined by a second angle which extends from the second point to a third point,
the second outer raceway defining a third raceway surface having the first radius of curvature extending across a third arc defined by the first angle which extends from a fourth point to a fifth point,
the second outer raceway defining a fourth raceway surface having the second radius of curvature extending across a fourth arc defined by the second angle which extends from the fifth point to a sixth point,
the first radius of curvature is greater than the second radius of curvature, the first outer raceway extending arcuately along a portion of the radially inward facing surface between the first substantially cylindrical surface and a first edge of the third substantially cylindrical surface, the second outer raceway extending arcuately along a portion of the radially inward facing surface between the second substantially cylindrical surface and a second edge of the third substantially cylindrical surface;
an inner ring disposed within the outer ring and having a first end, a second, a first inner raceway and a second inner raceway each being defined by a radially outward facing surface of the inner ring, the radially outward facing surface having a fourth substantially cylindrical surface proximate the first end having a third radius measured from the longitudinal axis C, the radially outward facing surface having a fifth substantially cylindrical surface proximate the second end having the third radius, the radially outward facing surface having a radially outward facing sixth substantially cylindrical surface having a fourth radius measured from the longitudinal axis C where the fourth radius is less than the third radius, the first inner raceway defining a third raceway surface having a third radius of curvature extending across a third arc defined by the first angle which extends from seventh point to an eighth point, the first inner raceway defining a fourth raceway surface having the second radius of curvature extending across a fourth arc defined by the second angle which extends from a ninth point to the eight point, the second inner raceway defining a fifth raceway surface having the third radius of curvature extending across a fifth arc defined by the first angle which extends from tenth point to an eleventh point, the second inner raceway defining a sixth raceway surface having the second radius of curvature extending across a sixth arc defined by the second angle which extends from a twelfth point to the tenth point, the third radius of curvature is greater than the second radius of curvature, the first inner raceway extending arcuately along a portion of the radially outwardly facing surface between the fourth substantially cylindrical surface and a first edge of the sixth substantially cylindrical surface, the second inner raceway extending arcuately along a portion of the radially outwardly facing surface between the fifth substantially cylindrical surface and a second edge of the sixth substantially cylindrical surface;

a first plurality of balls disposed partially in the first inner raceway and the first outer raceway, a second plurality of balls disposed partially in the second inner raceway and the second outer raceway, the first plurality of balls and the second plurality of balls each including load bearing balls and spacer balls, each of the spacer balls of the first plurality of balls engages two adjacent load bearing balls to prevent skidding of the load bearing balls relative to the first outer raceway and the first inner raceway, when the outer ring is rotationally accelerated relative to the inner ring, each of the spacer balls of the second plurality of balls engages two adjacent load bearing balls to prevent skidding of the load bearing balls relative to the second outer raceway and the second inner raceway, when the outer ring is rotationally accelerated relative to the inner ring;

each of the load bearing balls of the first plurality of balls having a first single point of contact with the first outer raceway between the second point and the a third point, and a second single point of contact with the first inner raceway between the ninth point and the a seventh point, the first single point of contact and the second single point of contact defining a first line of contact; each of the load bearing balls of the second plurality of balls having a third single point of contact with the second outer raceway between the fifth point and the a sixth point, and a fourth single point of contact with the second inner raceway between the twelfth point and the a tenth point, the third single point of contact and the fourth single point of contact defining a second line of contact;

the first line of contact and the second line of contact having a point of intersection at a point radially away from the outer ring, thereby defining a back-to-back configuration of the first outer raceway and the second outer raceway in the outer ring; and the load bearing balls being preloaded between the outer ring and the inner ring at predetermined force.

\* \* \* \* \*